United States Patent Office 2,925,423
Patented Feb. 16, 1960

2,925,423

SOLVENT-SOLUBLE METAL PHTHALOCYANINE COMPOUNDS AND PROCESS OF MAKING THE SAME

Viktor Weinmayr, Landenberg, Pa., assignor to E. I. du Pont de Nemours and Company, Wilmington, Del., a corporation of Delaware No Drawing. Application January 24, 1958
Serial No. 710,867

8 Claims. (Cl. 260—314.5)

This invention relates to a novel series of metal phthalocyanine derivatives which are soluble in organic solvents such as acetone, alcohol, benzene and pyridine. For simplicity of reference, acetone will be used hereinafter as typical of said group of organic solvents, and a substance will be considered as soluble in this standard, if it dissolves therein to the extent of at least 0.1% by weight, although at 20° C. some of the compounds discussed hereinbelow will dissolve to an extent as high as 10% or even higher.

As is well known, metal phthalocyanine such as copper phthalocyanine, nickel phthalocyanine or cobalt phthalocyanine, are pigments, characterized by their extreme insolubility in water and in organic solvents. In the case of acetone or benzene, for instance, not enough of said pigments can be dissolved therein, whether at room temperature or at the boiling point of the solvent, to give a perceptibly colored solution. The same is true of most nuclearly substituted derivatives of said compounds, such as nitro, amino, halogeno, alkoxy, phenyl, phenoxy, anilino, etc. Sulfonated copper phthalocyanine is soluble in water if the degree of sulfonation is high enough; but phthalocyanine derivatives soluble in organic solvents have been scarce.

In U.S. Patent 2,227,628, fluorinated copper phthalocyanine containing up to 7 fluorine atoms per molecule and polychloropolyfluoro copper phthalocyanines have been described. But these compounds are pigments, insoluble in water and in organic solvents.

In the case of chlorinated derivatives, copper phthalocyanines having various Cl contents, from 0.5 atom (on the average) to 15.5 or even 16 atoms per molecule have been known for a long time. But in their solubility characteristics they are true to the rule: They are insoluble in water and in organic solvents.

This invention is based on the amazing discovery that metal phthalocyanines containing both fluorosulfonyl groups and nuclear halogen substituents, there being at least two SO₂F groups and at least one nuclear halogen atom per molecule, are soluble in organic solvents, as typified by a solubility of at least 0.1% by weight in acetone and often rising to more than 10%. This is true particularly where the nuclear halogen is fluorine, chlorine or bromine. (In other words, it has an atomic number not exceeding 35.)

Accordingly, this invention embraces as its principal object the production of novel compounds which may be expressed by the general formula

(I)

wherein MPc designates the molecule of a metal phthalocyanine, M being a metal of the group consisting of copper, nickel and cobalt, X designates halogen selected from the group consisting of fluorine, chlorine and bromine, n is a numeral from 2 to 4, and y is a numeral not less than 1. A further object of this invention is to provide practical processes for synthesizing compounds of the above formula. Various additional objects and achievements of this invention will appear as the description proceeds.

My preferred process for manufacturing said compounds comprises heating a metal phthalocyanine polysulfonic acid, or an alkali-metal salt thereof, or an ester thereof (e.g. an alkyl ester of 1 to 4 C-atoms in the alkyl radical), or a metal phthalocyanine polysulfonyl chloride or polysulfonamide, or a nuclear halogen derivative of any such compound in a mixture of sulfur tetrafluoride and hydrogen fluoride in a sealed vessel, at a temperature of 100° to 175° C., for a convenient length of time, say 1 to 8 hours. The metal in said initial phthalocyanine compound is preferably one of those above mentioned, namely, copper, nickel or cobalt. The number of sulfo groups per molecule (using this term to embrace both the sulfonic acid radical and its functional derivatives as above specified) is preferably not less than 2 per molecule. Customarily, however, it will be 3 to 4.

As already indicated, the initial material may be entirely free of halogen in the nucleus, or it may contain from 1 to (16−n) halogen atoms (F, Cl or Br) per molecule, n being the number of sulfo groups in the molecule.

Altogether, the initial material may be defined by the formula

(II)

wherein MPc, n and X have the same meaning as in Formula I, the subscript z may have a value from zero to (16−n) inclusive, while Z stands for OH, OM₁ (M₁=an alkali metal), OR (R=alkyl of 1 to 4 C-atoms), Cl or NH₂.

The process above outlined not only converts the SO₂Z groups into SO₂F groups, but also tends to introduce fluorine into the Bz nuclei. As a consequence, y in the final product (Formula I above) will generally be greater than z in the initial material (Formula II), provided z is not near its upper limit of (16−n).

Furthermore, where the initial material has no halogen at all or only a low content thereof, the product of the autoclaving treatment may be subjected to halogenation in known manner to introduce additional halogen atoms into the nuclei, which halogen atoms may be chlorine, bromine or more fluorine.

Finally, I may treat the initial material of Formula II above with agents adapted only to replace Z in the group SO₂Z by fluorine, i.e., without achieving simultaneous fluorination in the ring. If the initial material has no nuclear halogen (i.e., z=0 in Formula II), the product of this treatment may be isolated and then treated with agents adapted to introduce halogen (F, Cl or Br) into the Bz-rings. A simple illustration of such alternative process is the treatment of copper phthalocyanine tetrasulfonyl chloride in an autoclave with a solution of potassium fluoride in hydrogen fluoride, recovering the resulting copper phthalocyanine tetrasulfonyl fluoride and reacting upon the latter with a desirable halogenating agent, such as chlorine, bromine, sulfur monochloride or sulfur tetrafluoride, in hydrogen fluoride.

It will be clear from the aforegoing available methods of synthesis that $X_y$ in the formula of the product is not limited to representing a single halogen; instead, it may represent various combinations of Cl and F, Br and F, or Cl, Br and F, whose total number per molecule is $y$.

The quantities of SF₄ and HF to be employed in my preferred process above set forth may vary from 1 to 10 parts (by weight) of SF₄ and from 0.5 to 50 parts of HF per part of initial polysulfo metal phthalocyanine. The preferred duration of the heating is best determined by experiment and observation of the results. One hour will give a quantity of acetone-soluble product in some cases, but a longer period generally increases the yield. Two to six hour may be taken as an optimum period for most cases.

The theory of the reaction is not altogether clear to me, and should not be taken in any sense as a limitation upon this invention. But for the sake of making the understanding thereof clearer, I offer the following as a probable hypothesis for the course of the reaction.

The sulfur tetrafluoride acts on the $SO_2Z$ groups, converting them into $SO_2F$ groups, and in combination with HF it acts further on the benzene nuclei to replace some of the H-atoms (if such are still available) by fluorine.

An incidental, equally unexpected, but most valuable property of my novel compounds is that they possess increased resistance to oxidation. Thus, whereas copper phthalocyanine and copper phthalocyanine sulfonic acids are readily oxidized by acidic, aqueous, ceric sulfate solutions at room temperature, and whereas even polychlorinated copper phthalocyanine containing as high as 14 Cl-atoms per molecule is quickly oxidized by ceric sulfate solutions upon slight warming, many of the novel compounds of this invention will withstand heating in boiling ceric sulfate solution (110° C.) for several hours without being changed to any perceptible degree.

This valuable collateral property makes my novel compounds useful in many fields where hitherto known phthalocyanine compounds have not been applicable. For instance, inasmuch as the novel compounds of this invention are not attacked by peroxides, they may be incorporated as colorants into monomers which are to be polymerized by the aid of dibenzoyl peroxide or similar catalysts into plastics.

My novel compounds may also be utilized where their solubility in organic solvents shows up to advantage. For instance, they may be applied to textile fibers from organic solvent solution, to produce brilliant blue to green, and usually light-fast dyeings on most of them. They may also be incorporated into inks and lacquers, from which printings can be made exhibiting the exceptional light-fastness and pleasing brilliance of the phthalocyanine colors in general. On the other hand, they may also be used as pigments, like hitherto known phthalocyanines, but with the added advantage that the resulting prints or coatings possess high stability to fading by oxidiation.

Without limiting this invention, the following examples are given to illustrate my preferred mode of operation. Parts mentioned are by weight.

*Example 1*

Ten parts of the sodium salt of sulfonated copper phthalocyanine (obtained by direct sulfonation of copper phthalocyanine and containing an average of 2.4 sulfo groups per molecule), 90 parts of anhydrous hydrogen fluoride, and 30 parts of sulfur tetrafluoride were charged into a stainless steel bomb which had been cooled in a Dry Ice-acetone mixture and had been swept with nitrogen. The bomb was closed and put into an oil bath where it could be agitated. The temperature of the oil bath was raised to 150° C. over a period of about four hours and the bomb was agitated at an oil bath temperature of 150° to 155° C. for six hours. After cooling the bomb to room temperature it was cooled further in iced water and the remaining pressure, mainly due to an excess of sulfur tetrafluoride, was released. The reaction mass was then poured onto about 200 parts of ice, filtered, washed nearly acid free, slurried in 200 parts of dilute aqueous ammonia to neutralize all hydrogen fluoride, filtered and washed again with water, and dried at 80° to 90° C. The deep blue solid thus obtained was extracted with acetone. Upon evaporation of the acetone, 4.9 parts of a fluorinated copper phthalocyanine was obtained.

Analyses of the new blue dye showed a N:F ratio of about 1:1. Inasmuch as there are 8 N-atoms per molecule, and inasmuch as the initial material contained, on the average, only about 2.4 sulfo groups per molecule, and since it appears logical that each $SO_3Na$ group is converted in the above reaction to $SO_2F$, it follows from the above analysis that considerable nuclear fluorination has taken place, resulting in fact in some 5 to 6 nuclear F-atoms per molecule.

The acetone and benzene solutions of the reaction product were blue; sulfuric acid solutions were green. The product showed also marked solubility in many other organic solvents. It was also highly resistant to oxidation with a hot dilute sulfuric acid-ceric sulfate solution, whereas the starting material was readily oxidized in this solution at room temperature. The new product was also very resistant to oxidation with boiling 95% nitric acid. Upon oxidation with fuming nitric acid, a high yield of a sulfonyl fluoride of phthalimide was obtained.

The fluorinated copper phthalocyanine of this example did not lose its solubility in organic solvents by heating it in 100% sulfuric acid to 130° C. and drowning the solution on ice. Neither did it become water- or ammonia-soluble by that treatment.

*Example 2*

Twenty parts of the potassium salt of a copper phthalocyanine tetra(4)sulfonic acid (made from 4-sulfophthalic acid), 60 parts of anhydrous hydrogen fluoride, and 30 parts of sulfur tetrafluoride were heated in a nickel bomb to 150° C. for 6 hours. After isolation of the reaction product and extraction with acetone as described in Example 1, 7.5 parts of acetone-soluble blue product were obtained. Analyses of the new blue dye gave a N:F ratio of 1:1, which indicates that the product is copper tetrafluoro-phthalocyanine tetrasulfonyl fluoride.

The tetrasulfo starting material was readily oxidized by aqueous, acidic, ceric sulfate at room temperature, but the fluorinated reaction product was oxidized in the same medium only upon heating. Upon oxidation of the new soluble dye with fuming nitric acid at the boil, a sulfonyl fluoride of phthalimide was obtained.

The soluble dye of this example was also stable upon heating to 130° C. in 100% sulfuric acid, and remained water- and alkali-insoluble, and organic-solvent-soluble after that treatment.

*Example 3*

Two parts of a copper phthalocyanine sulfonyl chloride containing an average of three sulfonyl chloride groups for molecule, and made by reacting copper phthalocyanine with chlorosulfonic acid, 20 parts of anhydrous hydrogen fluoride, and 7 parts of sulfur tetrafluoride were heated at 150° C. for six hours, and the reaction product was isolated, as described in Example 1. 1.4 parts of acetone-soluble fluorinated reaction products were obtained, whose analyses showed a N:F ratio of 1:1. It also contained chlorine. The acetone-soluble product was insoluble in hot dilute aqueous ammonia. It was soluble in 100% sulfuric acid and was recovered from it (by drowning in water and filtration) in its original, water insoluble, organic-slovent-soluble form.

*Example 4*

Two parts of the potassium salt of nickel phthalocyanine disulfonic acid (prepared by sulfonating nickel phthalocyanine in 20 parts of 10% oleum, drowning in dilute KCl solution, filtering and washing with 15% KCl solution), 20 parts of anhydrous hydrogen fluoride, and 5 parts of sulfur tetrafluoride were heated at 150° C. under autogenous pressure for six hours. Upon dilution and extraction with acetone in the manner hereinabove set forth, 0.3 part of material dissolving in acetone, and other organic solvents, with a blue color was obtained.

Example 5

Fifteen parts of a mixture of copper phthalocyanine polysulfonyl chlorides (being a mixture of tri- and tetra-sulfonyl chlorides, and containing both the 3 and 4 isomers), 10 parts of potassium fluoride dihydrate (KF.2H$_2$O) and 80 parts of anhydrous hydrogen fluoride were heated in a closed nickel vessel at 150° C. for 4 hours. The reaction mass was then cooled and poured on ice. The blue precipitate was filtered, washed acid free, and dried over calcium chloride in an evacuated desiccator at room temperature. 8.4 parts of a compound analyzing essentially as a copper phthalocyanine polysulfonyl fluoride were obtained. The product was very slightly soluble in acetone. The compound was insoluble in warm dilute ammonium hydroxide while the starting material, the copper phthalocyanine sulfonyl chloride, dissolved instantly to a blue solution in dilute aqueous ammonia.

Higher yields were obtained in this example when anhydrous potassium fluoride was used instead of the dihydrate.

Example 6

Five parts of copper phthalocyanine polysulfonyl fluoride prepared as described in Example 5 and 75 parts of anhydrous hydrogen fluoride were cooled in a nickel vessel in a Dry Ice-acetone bath, and 5 parts of chlorine were added. The vessel was closed and the charge was then heated over a period of two hours to 100° C. and agitated at 100° C. for two hours. The reaction mass was then poured on ice, and 4 parts of a dark green solid were isolated and then extracted with acetone. Upon evaportaion of solvent from the green solution, a green solid containing 20% chlorine was obtained. This product was readily soluble in acetone with a green color, while the unchlorinated starting material was only slightly soluble in acetone with a blue color.

Example 7

Five parts of a mixture of copper phthalocyanine polysulfonyl fluoride as obtained in Example 5 were added to 25 parts of sulfur dichloride which had been cooled in a stainless steel bomb in a Dry Ice-acetone mixture. 90 parts of hydrogen fluoride were then added, and the charge was heated at 150° C. for six hours, under autogenous pressure. The reaction mass was cooled, poured on ice and the precipitate was isolated in the usual manner. This precipitate amounted to 4 parts and was contaminated with elemental sulfur. Upon extraction with acetone and evaporation of solvent from the green solution, a green solid was obtained which analyzed as having a ratio of N:Cl:F=8:12.2:5.5.

Example 8

Three parts of bromine were put into a nickel vessel and cooled in a Dry Ice-acetone mixture. 5 parts of a mixture of copper phthalocyanine polysulfonyl fluorides from Example 5 were added, followed by 60 parts of anhydrous hydrogen fluoride. The charge was heated in the closed nickel vessel at 150° C. for six hours and then poured on ice. The precipitate was isolated in the usual manner and 4 parts of a green solid were obtained. Upon extraction with acetone (deep green solution) and evaporation of solvent, a green product readily soluble in acetone with a green color was obtained.

It will be understood that the details of procedure may be varied widely within the skill of those engaged in this art. If nickel chloride or cobalt chloride is used in lieu of the copper salt in the synthesis of the phthalocyanine compound, the resulting metal polysulfophthalocyanine, when carried through the procedures of the above examples, will lead to acetone-soluble derivatives of nickel- and cobalt-phthalocyanine, respectively.

The hydrogen fluoride employed in some of the above examples has been specified as anhydrous; in other examples, technical hydrogen fluoride has been used by me. The latter contains traces of moisture. Thus, anhydrous HF is not an absolute requirement for this reaction, but is a desirable goal from the practical viewpoint, inasmuch as hydrogen fluoride containing water is highly corrosive to equipment.

In the synthesis employing metal phthalocyanine sulfonic acids or salts thereof, the reaction mass should contain at least 0.5 part by weight of HF and at least 1.0 part of SF$_4$ per part of the initial metal phthalocyanine compound. But I know of no theoretical upper limit, except the obvious consideration that the larger the excess of either gas employed, the larger the expense of subsequent recovery. Consequently, upper limits of 50 parts of HF by weight and 10 parts of SF$_4$ are recommended as a matter of economy.

I claim as my invention:

1. A compound of the formula

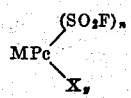

wherein MPc designates the molecule of a metal phthalocyanine, M being a metal of the group consisting of copper, nickel and cobalt, X designates halogen selected from the group consisting of fluorine, chlorine and bromine, $n$ is a numeral from 2 to 4, and $y$ is a numeral not less than 1, said compound being characterized by greater solubility in acetone and by increased resistance to oxidation in acidic aqueous ceric sulfate solution compared to the corresponding unsubstituted phthalocyanine compound of form MPc.

2. Copper polyhalogeno-phthalocyanine polysulfonyl fluoride, wherein the halogen is of atomic number not exceeding 35, said compound being characterized by greater solubility in acetone and by increased resistance to oxidation in acidic aqueous ceric sulfate solution compared to copper phthalocyanine.

3. Copper polychloro-phthalocyanine tetrasulfonyl fluoride, the number of chlorine atoms being not less than 4 and not more than 12 per molecule, said compound being characterized by greater solubility in acetone and by increased resistance to oxidation in acidic aqueous ceric sulfate solution compared to copper phthalocyanine.

4. Copper tetrafluoro-phthalocyanine tetrasulfonyl fluoride, said compound being characterized by greater solubility in acetone and by increased resistance to oxidation in acidic aqueous ceric sulfate solution compared to copper phthalocyanine.

5. The process of producing an acetone-soluble metal phthalocyanine, which comprises heating together under autogenous pressure a metal phthalocyanine compound of the group consisting of metal phthalocyanine polysulfonic acids, their alkali-metal salts, metal phthalocyanine polysulfonyl chlorides, metal phthalocyanine polysulfonamides, metal phthalocyanine polysulfonic acid esters and the nuclear halogen derivatives of any of these, and a mixture of sulfur tetrafluoride and hydrogen fluoride, whereby to obtain a nuclearly fluorinated metal phthalocyanine polysulfonyl fluoride.

6. A process as in claim 5, including the further step of reacting upon the compound thus produced with a halogenating agent of the group consisting of brominating and chlorinating agents, whereby to introduce additional halogen into the Bz-nuclei of the compound.

7. A process as in claim 5, wherein the reaction is achieved by heating a mixture of the reactants, under autogenous pressure at a temperature between 100° and 175° C.

8. The process of producing an acetone-soluble copper phthalocyanine, which comprises heating together under autogenous pressure copper phthalocyanine-tetrasulfonic acid and a mixture of hydrogen fluoride and sulfur tetrafluoride, whereby to produce copper tetrafluoro-phthalocyanine tetrasulfonyl fluoride.

References Cited in the file of this patent

UNITED STATES PATENTS

| | | |
|---|---|---|
| 2,225,441 | Braun et al. | Dec. 17, 1940 |
| 2,227,628 | Calcott | Jan. 7, 1941 |
| 2,702,306 | Gall et al. | Feb. 15, 1955 |

FOREIGN PATENTS

| | | |
|---|---|---|
| 857,415 | France | Apr. 15, 1940 |
| 514,857 | Great Britain | Nov. 20, 1939 |
| 515,637 | Great Britain | Dec. 11, 1939 |
| 281,990 | Switzerland | Mar. 31, 1952 |